(12) United States Patent
Ito

(10) Patent No.: US 8,188,729 B2
(45) Date of Patent: May 29, 2012

(54) ROLLING BEARING WITH A ROTATION SENSOR

(75) Inventor: Hiroyoshi Ito, Kuwana (JP)

(73) Assignee: NTN Corporation, Osaka (JP)

( * ) Notice: Subject to any disclaimer, the term of this patent is extended or adjusted under 35 U.S.C. 154(b) by 172 days.

(21) Appl. No.: 12/447,507

(22) PCT Filed: Oct. 29, 2007

(86) PCT No.: PCT/JP2007/071003
§ 371 (c)(1),
(2), (4) Date: Apr. 28, 2009

(87) PCT Pub. No.: WO2008/053823
PCT Pub. Date: May 8, 2008

(65) Prior Publication Data
US 2010/0052662 A1      Mar. 4, 2010

(30) Foreign Application Priority Data
Oct. 30, 2006      (JP) .................................. 2006-294529

(51) Int. Cl.
*G01B 7/30*          (2006.01)
(52) U.S. Cl. ..................... 324/207.25; 324/173
(58) Field of Classification Search ............. 324/207.15, 324/173
See application file for complete search history.

(56) References Cited

U.S. PATENT DOCUMENTS

| | | | | |
|---|---|---|---|---|
| 4,259,637 A | * | 3/1981 | Bloomfield et al. | 324/166 |
| 4,602,891 A | * | 7/1986 | McBride | 403/211 |
| 4,851,611 A | * | 7/1989 | De Concini et al. | 174/555 |
| 5,122,741 A | * | 6/1992 | Ohsumi | 324/207.13 |
| 5,647,774 A | * | 7/1997 | Yamamoto | 439/752 |
| 6,118,271 A | * | 9/2000 | Ely et al. | 324/207.17 |
| 6,541,958 B2 | * | 4/2003 | Harada | 324/174 |
| 6,595,692 B2 | * | 7/2003 | Itou | 384/448 |
| 6,812,695 B2 | * | 11/2004 | Landrieve | 324/207.25 |
| 7,249,891 B2 | * | 7/2007 | Aoki et al. | 384/448 |
| 7,337,679 B2 | * | 3/2008 | Hattori et al. | 73/862.08 |
| 7,786,727 B2 | * | 8/2010 | Sumi et al. | 324/207.25 |

(Continued)

FOREIGN PATENT DOCUMENTS

GB       2244605 A   * 12/1991

(Continued)

OTHER PUBLICATIONS

International Search Report issued Nov. 27, 2007 in the International (PCT) Application of which the present application is the U.S. National Stage.

(Continued)

*Primary Examiner* — Reena Aurora
(74) *Attorney, Agent, or Firm* — Wenderoth, Lind & Ponack, L.L.P.

(57) ABSTRACT

In a magnetic sensor 7, a tubular duct 9a for output cables 12 is formed integrally with a sensor housing 9, provided with an opening 14 having a uniform width from a proximal end to a distal end of the duct 9a on a side face thereof. The output cables 12 are mounted through the duct 9a from this opening 14, and then a slidable lid 15 is mounted to close the opening 14. Thus damage to the output cables 12 connected to the magnetic sensor 7 is prevented and, at the same time, drawing the output cables 12 outside the sensor housing 9 is made easier.

5 Claims, 3 Drawing Sheets

U.S. PATENT DOCUMENTS 7,797,127 B2 * 9/2010 Desbiolles et al. ........... 702/163
7,884,600 B2 * 2/2011 Takahashi ................ 324/207.25

FOREIGN PATENT DOCUMENTS

| JP | 6-327181 | 11/1994 |
| JP | 2002-213472 | 7/2002 |
| JP | 2005-233849 | 9/2005 |
| JP | 2006-258542 | 9/2006 |

OTHER PUBLICATIONS

Japanese Office Action (Notice of Reasons for Rejection) (with English translation), issued Jan. 31, 2012 in a Japanese application that is a foreign counterpart to the present application, application No. 2006-294529.

* cited by examiner

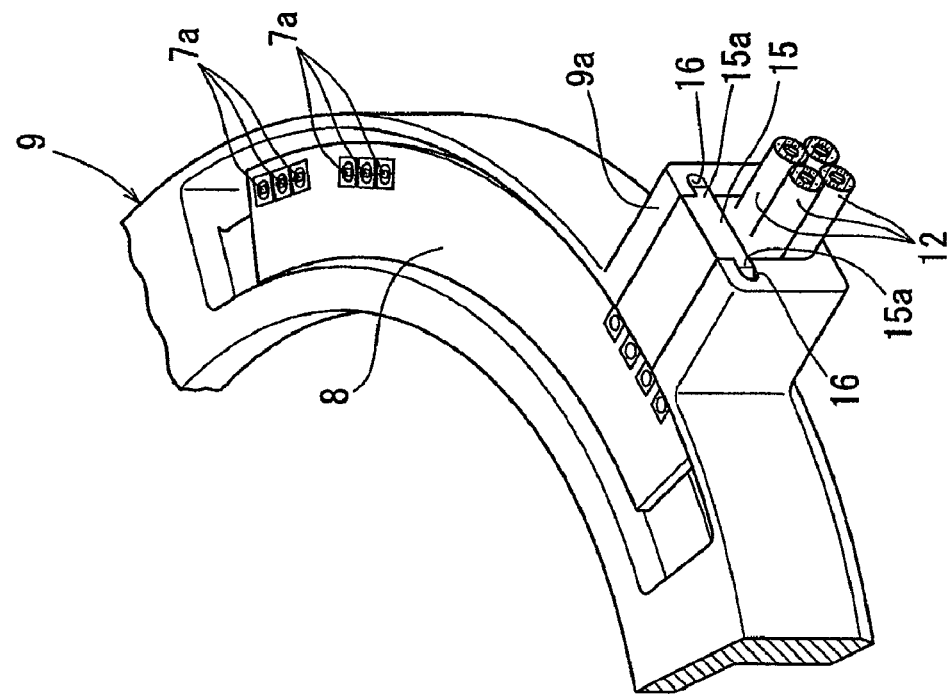
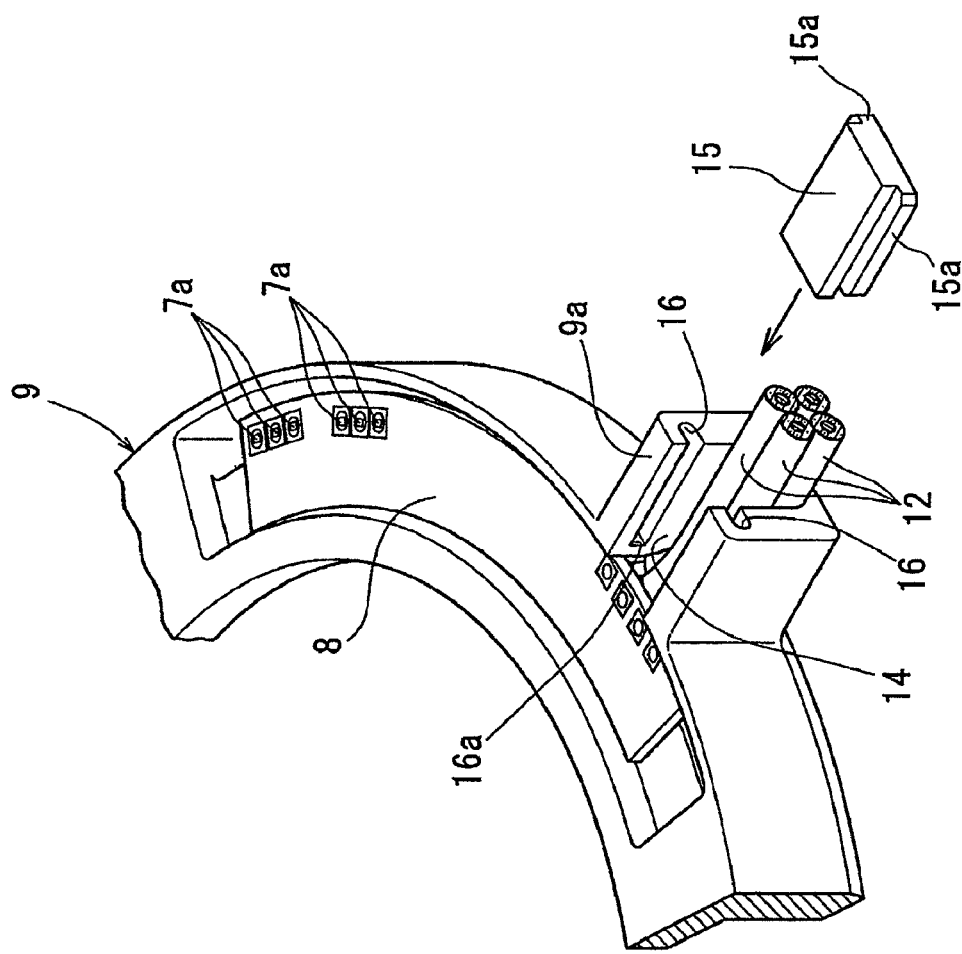

ROLLING BEARING WITH A ROTATION SENSOR

TECHNICAL FIELD

This invention relates to a rolling bearing with a rotation sensor.

BACKGROUND OF THE INVENTION

A rolling bearing with a rotation sensor is sometimes used for supporting a rotation shaft in a variety of devices to detect its rotational speed (number of revolutions). This rolling bearing with a rotation sensor has an annular magnetic encoder alternately polarized in different magnetic poles in the circumferential direction and mounted on one of the inner and outer races of the bearing that is rotatable. A sensor housing incorporating a magnetic sensor for detecting the change of the magnetic flux when the encoder rotates is mounted on the other stationary race to detect the rotation of the rotating race. A circuit board for processing the output of the magnetic sensor is often mounted in the sensor housing.

In many cases, such a sensor housing for a rolling bearing with a rotation sensor is made of a resin, and mounted on the stationary race through a metal outer ring. Among those resin sensor housings, some have a tubular duct formed integrally with the housing so that output cables of the magnetic sensor, which are connected to the circuit board in the sensor housing and drawn out of the housing, will not be damaged or broken by shearing or other forces (e.g. JP 2002-213472A).

In the rolling bearing with the rotation sensor (a magnetic sensor) described in JP 2002-213472A, the output cables of the magnetic sensor can be protected from damage. But the output cables connected to the circuit board inside the sensor housing have to be mounted to extend outside through the tubular duct, and the mounting process is a laborious process.

SUMMARY OF THE INVENTION

An object of this invention is to protect the output cables of the magnetic sensor from damage and, at the same time, to facilitate the process of mounting the output cables to extend to the outside.

To achieve the above-mentioned object, this invention provides a rolling bearing with a rotation sensor comprising an inner race, an outer race, wherein one of the inner and outer races is a rotating race, and the other is a stationary race, an annular magnetic encoder polarized alternately in different magnetic poles in a circumferential direction and mounted on the rotating race, a magnetic sensor for detecting change of magnetic flux when the magnetic encoder rotates, and a resin sensor housing incorporating the magnetic sensor therein and mounted on the stationary race, the resin sensor housing being integrally formed with a tubular duct through which output cables of the magnetic sensor extend to outside, wherein an opening is provided in a side face of the tubular duct to extend from its proximal to distal ends, and the rolling bearing further comprises a lid, wherein with the output cables mounted through the duct via the opening, the lid can be mounted to the duct to close the opening.

In this invention, the opening extending from the proximal end to the distal end of the tubular duct is provided on the side face of the tubular duct. The output cables are mounted through the duct via this opening, and then the lid is mounted to close the opening. Thus damage to the output cables of the magnetic sensor is prevented and, at the same time, drawing the output cables outside the sensor housing is made easier.

The opening of the duct can be closed more easily by configuring that the opening of the tubular duct has a uniform width from the proximal end to the distal end thereof so that the lid is to be mounted in the opening by sliding from the distal end to the proximal end thereof.

In the rolling bearing with a rotation sensor of this invention, the sensor housing is integrally formed with the tubular duct having an opening formed in the side face thereof to extend from its proximal to distal ends. The output cables are mounted through the duct by being inserted laterally via this opening, and then the lid is mounted to close the opening. Thus damage to the output cables of the magnetic sensor is prevented and, at the same time, drawing the output cables outside the sensor housing is made easier.

The opening of the duct can be closed more easily by making the opening of the duct extend with a uniform width from the proximal end to the distal end of the duct so that the lid is mounted in the opening by sliding it from the distal end to the proximal end thereof.

BRIEF DESCRIPTION OF THE DRAWINGS

FIGS. 3(a) and 3(b) are perspective views showing how the output cables are extended through the duct of the sensor housing of FIG. 2.

DETAILED DESCRIPTION OF THE INVENTION

Figure 1:
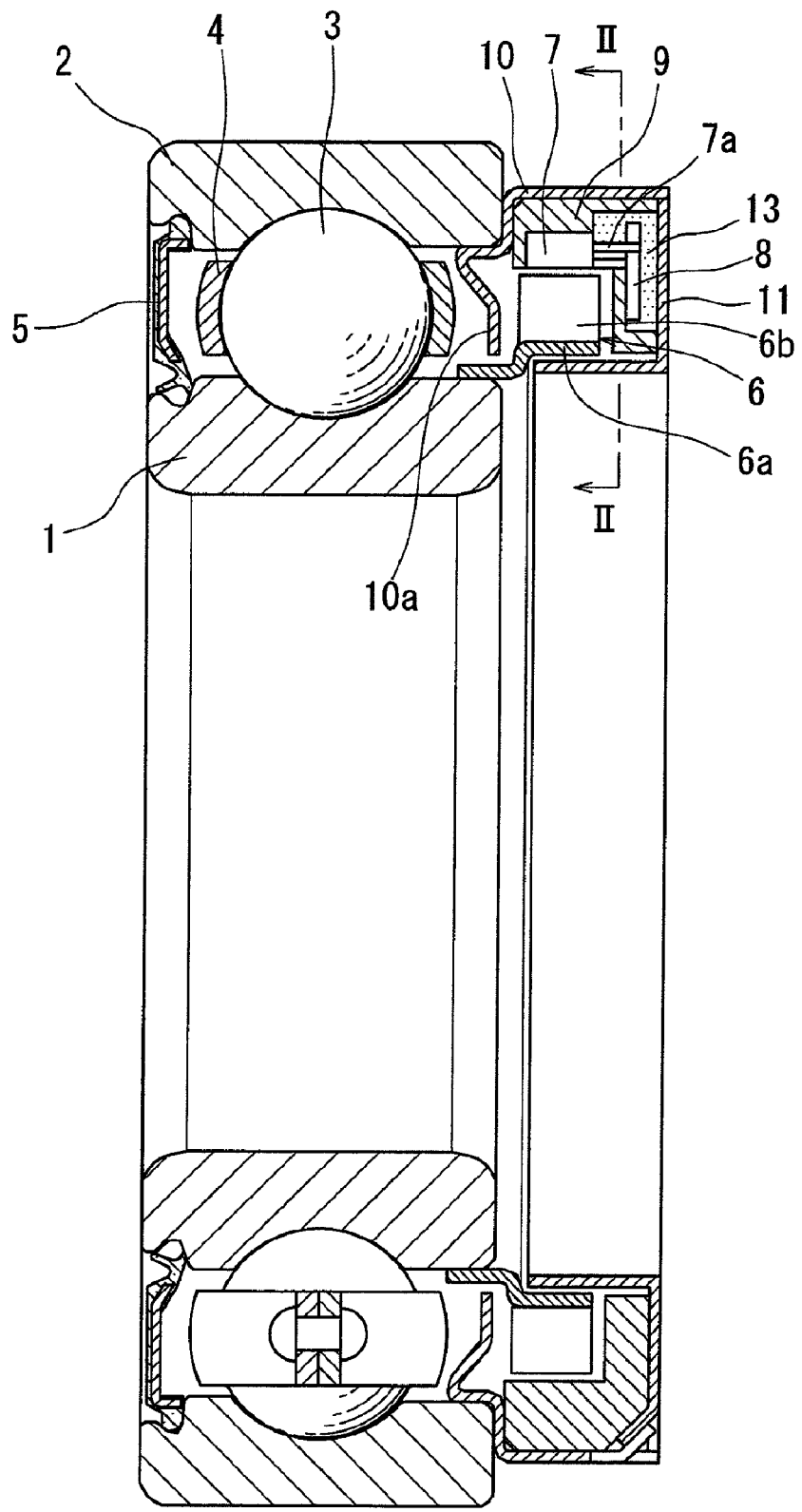
FIG. 1 is a vertical sectional view of a rolling bearing with a rotation sensor embodying the present invention.

An embodiment of this invention is now described with reference to the drawings. As shown in FIG. 1, the rolling bearing with a rotation sensor of the embodiment is a deep groove ball bearing comprising an inner race 1, which is rotatable, an outer race 2, which is stationary, and balls 3 provided between the inner and outer races and retained by a retainer 4. A magnetic encoder 6 is mounted on one side of the inner race 1, and a sensor housing 9, receiving magnetic sensors 7 and a circuit board 8, is mounted on the one side of the outer race 2 facing the magnetic encoder 6. On the other side of the outer race 2, which is axially opposite to the sensor housing 9, a seal member 5 is mounted to seal the interior of the bearing.

The magnetic encoder 6 comprises an annular core 6a and a magnetic body 6b polarized alternately in different magnetic poles in the circumferential direction, the core 6a being fitted around the inner race 1.

The sensor housing 9 is made of a polymer alloy which comprises polyphenylene sulfide (PPS) mixed with polyamide (PA) and polyimide (PI), and covered with an outer ring 10 and a side ring 11, which are formed by pressing SUS 403, a magnetic ferrite stainless steel plate, to shut out any external harmful magnetic field and to prevent corrosion. The sensor housing 9 is pressed in the outer ring 10, which is fitted in the outer race 2. On the inner end of the outer ring 10, a seal portion 10a is formed, sealing the interior of the bearing.

The polymer alloy forming the sensor housing 9, which comprises PPS mixed with PA and PI, has a higher glass transition temperature than PPS alone. This reduces slack that may occur between the sensor housing 9 and the outer ring 10, in which the sensor housing 9 is press-fitted, along with a decrease in temperature from a high temperature, thus reducing creep caused by temperature change.

Figure 2:
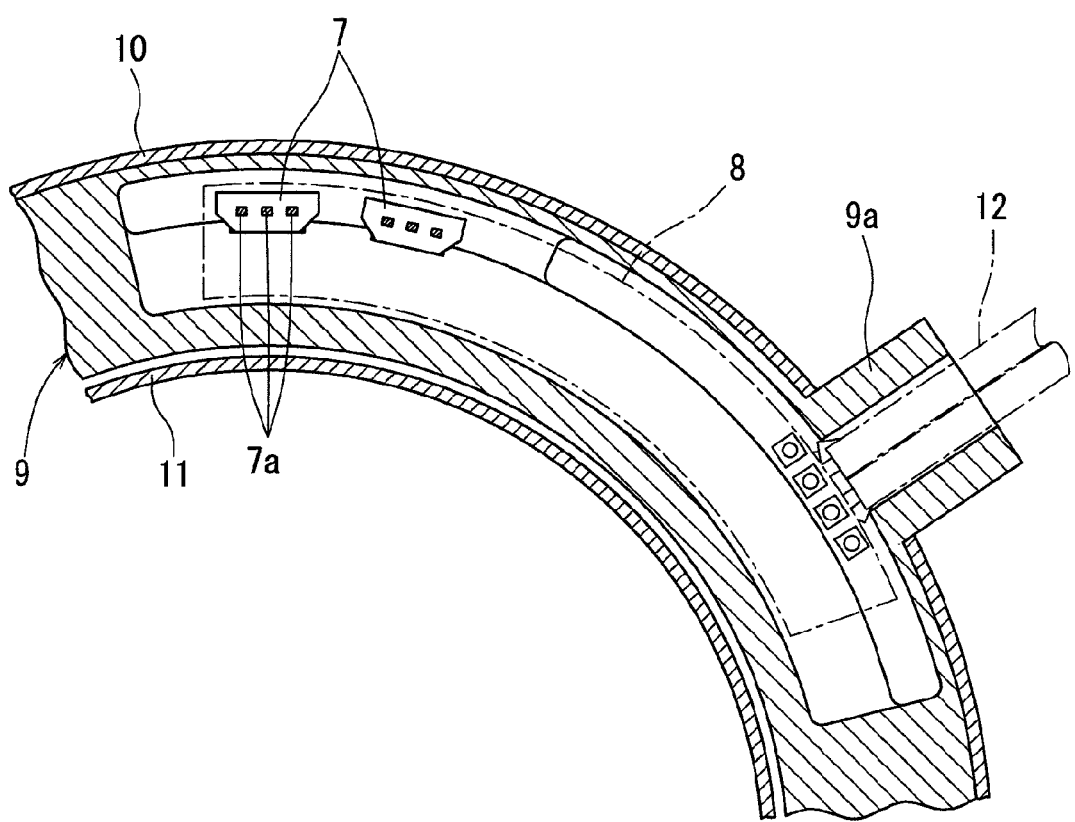
FIG. 2 is a sectional view taken along line II-II of FIG. 1.

As shown in FIGS. 1 and 2, the magnetic sensors 7 are provided at two circumferentially adjacent locations facing the magnetic encoder 6 in the radial direction. The magnetic sensors 7 are connected to the circuit board 8 through legs 7a. Output cables 12 of the magnetic sensors 7 connected to the circuit board 8 run in a longitudinal direction outside through a duct 9a which is formed integrally with the sensor housing 9. The magnetic sensors 7, the circuit board 8 and the output cables 12 inside the sensor housing 9 are fixed in position in a molded resin 13. The two magnetic sensors 7 are located adjacently in the circumferential direction to detect the direction of rotation from the time delay between detection outputs of these two magnetic sensors 7.

The duct 9a of the sensor housing 9 is, as shown in FIG. 3(a), provided with an opening 14 that opens laterally through a lateral side face of the duct 9a in a direction generally perpendicular to the longitudinal direction in which the cables 12 extend through duct 9a, such that, as shown in FIG. 3(a), the duct 9a is substantially U-shaped in cross section. The output cables 12 are put inside the duct 9a via this opening 14 and then a lid 15 is mounted to close the opening 14. The lid 15 is formed of the same polymer alloy as the sensor housing 9. Protruded portions 15a are provided on both sides of the lid 15. With the protruded portions 15a inserted in grooves 16 formed respectively on both sides of the opening 14 from its distal end, the lid 15 is slid toward the proximal end of the duct 9a until the protruded portions 15a are pressed against the inner ends 16a of the grooves 16 to close the opening 14.

A caulking agent such as silicon is then filled in the clearance around the output cables 12 in the duct 9a near its distal end. Thermosetting molding resin 13 such as epoxy resin and urethane resin is filled inside the sensor housing 9 including the duct 9a, and the lid 15 is bonded to the sensor housing 9.

The rolling bearing of the embodiment described above is a deep groove ball bearing with a rotatable inner race. But the rolling bearing according to this invention may be a different type of rolling bearing such as a roller bearing. This invention can be applied also to a rolling bearing in which the outer race is rotational. In this case, the magnetic encoder of the rotation sensor is provided on the outer race and the sensor housing incorporating the magnetic sensor is mounted on the inner race.

The invention claimed is:

1. A rolling bearing with a rotation sensor, comprising:
an inner race;
an outer race, wherein one of said inner and outer races is a rotating race, and the other is a stationary race;
an annular magnetic encoder polarized alternately in different magnetic poles in a circumferential direction and mounted on said rotating race;
a magnetic sensor for detecting change of magnetic flux when said magnetic encoder rotates; and
a resin sensor housing incorporating said magnetic sensor therein and mounted on said stationary race;
wherein said resin sensor housing is integrally formed with a tubular duct having a longitudinally-extending tubular hollow space configured to have output cables of said magnetic sensor extend therethrough in a longitudinal direction through both a proximal longitudinal end and a distal longitudinal end of the tubular duct to outside;
wherein an opening opens laterally, in a direction generally perpendicular to said longitudinal direction, through a lateral side face of said tubular duct and extends from the proximal longitudinal end to the distal longitudinal end of the tubular duct to allow the output cables to be laterally inserted through said opening to extend through said hollow tubular space of said tubular duct through both the proximal longitudinal end and the distal longitudinal end of the tubular duct and such that said tubular duct, with said opening in said lateral side face of said tubular duct, is substantially U-shaped in cross section;
wherein said rolling bearing further comprises a lid configured such that the output cables can be mounted via said opening to extend through said hollow tubular space of said tubular duct through both the proximal longitudinal end and the distal longitudinal end of the tubular duct, and with the output cables mounted in said tubular duct to extend through said hollow tubular space of said tubular duct through both the proximal longitudinal end and the distal longitudinal end of the tubular duct, said lid can be mounted to said tubular duct to close said opening; and
wherein said opening of the tubular duct has a uniform width from the proximal end to the distal end thereof, and wherein said lid is configured to be mounted in said opening by sliding from the distal longitudinal end to the proximal longitudinal end of said tubular duct.

2. The rolling bearing according to claim 1, wherein said lid is slidably mounted to said tubular duct to removably cover said opening.

3. The rolling bearing according to claim 1, wherein said lid is removably mounted to said tubular duct to removably cover said opening.

4. A rolling bearing with a rotation sensor, comprising:
an inner race;
an outer race, wherein one of said inner and outer races is a rotating race, and the other is a stationary race;
an annular magnetic encoder polarized alternately in different magnetic poles in a circumferential direction and mounted on said rotating race;
a magnetic sensor for detecting change of magnetic flux when said magnetic encoder rotates; and
a resin sensor housing incorporating said magnetic sensor therein and mounted on said stationary race;
wherein said resin sensor housing is integrally formed with a tubular duct having a longitudinally-extending tubular hollow space configured to have output cables of said magnetic sensor extend therethrough in a longitudinal direction through both a proximal longitudinal end and a distal longitudinal end of the tubular duct to outside;
wherein an opening opens laterally, in a direction generally perpendicular to said longitudinal direction, through a lateral side face of said tubular duct and extends from the proximal longitudinal end to the distal longitudinal end of the tubular duct to allow the output cables to be laterally inserted through said opening to extend through said hollow tubular space of said tubular duct through both the proximal longitudinal end and the distal longitudinal end of the tubular duct and such that said tubular duct, with said opening in said lateral side face of said tubular duct, is substantially U-shaped in cross section;
wherein said rolling bearing further comprises a lid configured such that the output cables can be mounted via said opening to extend through said hollow tubular space of said tubular duct through both the proximal longitudinal end and the distal longitudinal end of the tubular duct, and with the output cables mounted in said tubular duct to extend through said hollow tubular space of said tubular duct through both the proximal longitudinal end and the distal longitudinal end of the tubular duct, said lid can be mounted to said tubular duct to close said opening;
wherein said lid is slidably mounted to said tubular duct by a projection-and-groove configuration to removably cover said opening; and wherein said projection-and-groove configuration comprises projections provided on one of said lid and an interior of said tubular duct, and grooves provided in the other of said lid and the interior of said tubular duct, said grooves slidably receiving said projections, respectively.

5. The rolling bearing according to claim 4, wherein said projections are provided on said lid, and said grooves are provided in the interior said tubular duct.

* * * * *